April 6, 1954
E. ALLEMANN ET AL
2,674,007
EXTRUSION MACHINE FOR THE PRODUCTION OF AN INSULATING
COVERING OF AN ELECTRICAL CONDUCTOR
Filed May 8, 1952
3 Sheets-Sheet 1
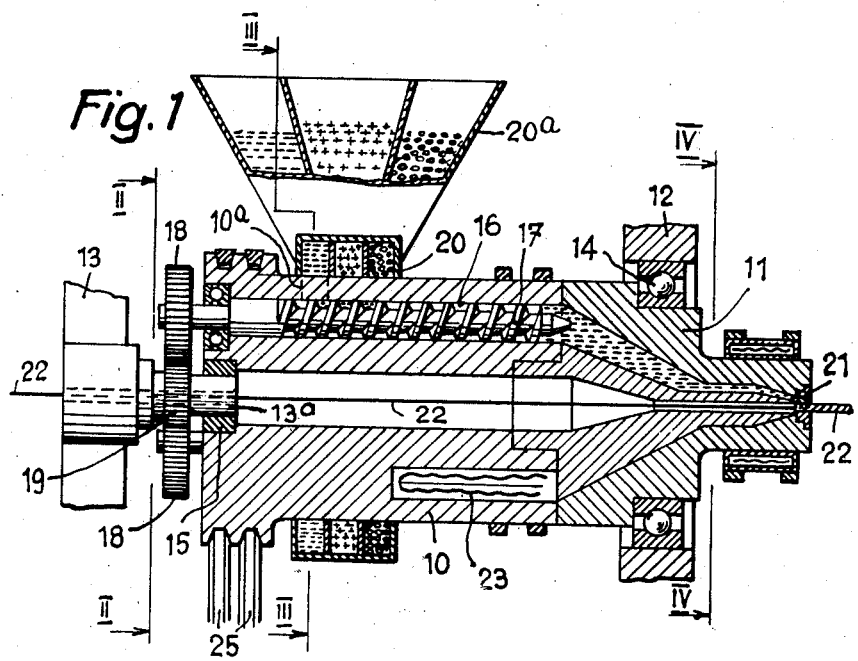
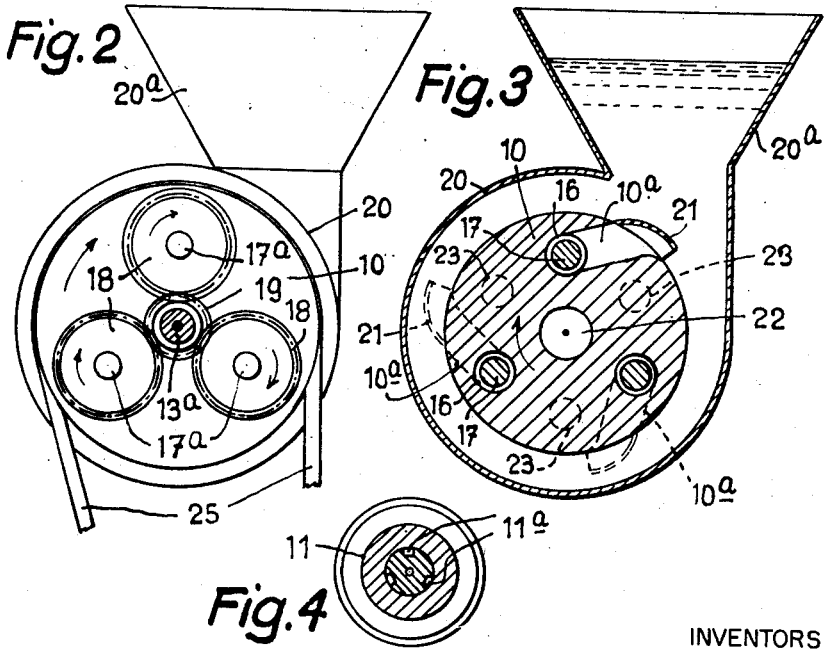
INVENTORS
ERNST ALLEMANN
ERNST FRITSCHI
HERBERT LEU
BY
*Kenway, Jenney, Witter & Hildreth*
ATTORNEYS

INVENTORS
ERNST ALLEMANN
ERNST FRITSCHI
HERBERT LEU

Patented Apr. 6, 1954

2,674,007

UNITED STATES PATENT OFFICE 2,674,007

EXTRUSION MACHINE FOR THE PRODUCTION OF AN INSULATING COVERING OF AN ELECTRICAL CONDUCTOR

Ernst Allemann, Breitenbach, and Ernst Fritschi and Herbert Leu, Busserach, Switzerland, assignors to Schweizerische Isola-Werke, Breitenbach, Switzerland Application May 8, 1952, Serial No. 286,852

Claims priority, application Switzerland November 23, 1951

18 Claims. (Cl. 18—13)

The present invention relates to an extrusion process and machine for the production of an insulating covering consisting of helically wound threads of thermoplastic material, preferably in different colors, on an electrical conductor.

It is a feature of the invention to provide a process of the type described, which comprises revolving eccentric orifices around a conductor to be covered, feeding thermoplastic material into passages, revolving said passages with said orifices, rotating conveyor screws in said passages about their own axis each to feed the material to and force it out of said orifices, and passing said electrical conductor through between said orifices.

Comprising a rotor which is provided with an extrusion head having a central passage for the wire to be covered, an extrusion machine is characterized according to the invention in that said rotor has bores extending between its two end faces and communicating with material feed means, in which bores there are arranged conveyor screws rotated by a gear drive and conveying the material which has been fed to the bores through ducts to the extrusion head rotating with the rotor.

Thus it is another feature of the invention to provide a machine of the type described, which comprises an extrusion head having material feed ducts and a central passage for the conductor to be covered, feed means for the thermoplastic material, a rotor part connected to said extrusion head and having two end faces and longitudinal bores extending between said end faces and communicating with said feed means and feed ducts, conveyor screws in said longitudinal bores, gear drive means operatively connected with said conveyor screws to rotate same and thus cause them to convey into said ducts material supplied to said longitudinal bores from said material feed means, and means to rotate said rotor part.

Three embodiments of the invention are illustrated by way of example on the accompanying drawings.

Fig. 1 is an axial, longitudinal sectional view of a first embodiment of the extrusion machine.

Figs. 2, 3, and 4 are cross-sectional views taken on the lines of section II—II, III—III, and IV—IV of Fig. 1.

Figure 5:
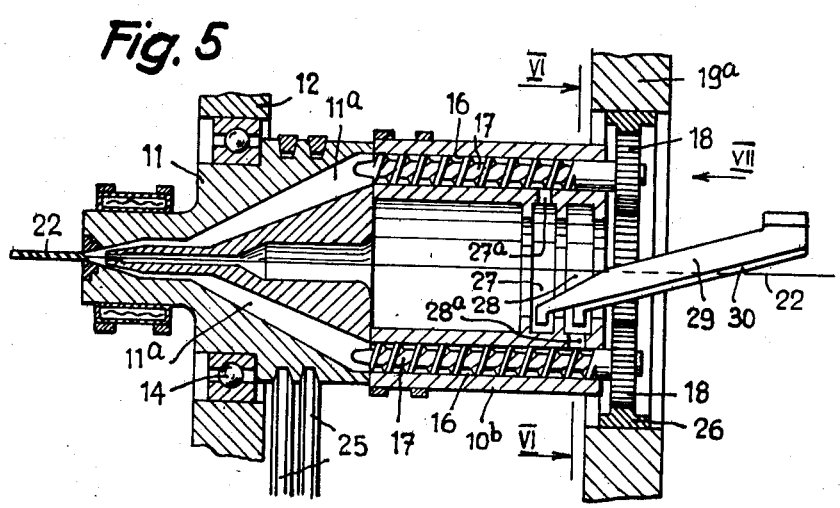
Fig. 5 is an axial, longitudinal sectional view of a second embodiment of the extrusion machine.

The extrusion machine shown in Fig. 1 has a cylindrical rotor element 10, to which an extrusion head 11 is affixed. The rotor formed by these two parts 10 and 11 is rotatably supported by two bearing pedestals 12 and 13, the head part 11 being supported by means of ball bearings 14 in the bearing pedestal 12, and the other end portion of the rotor being supported by means of a bearing ring 15 on a bearing pin 13a of the bearing pedestal 13. Three bores 16 parallel to the axis of rotation of the rotor are provided with symmetrical angular spacing in the rotor element 10 and a conveyor screw 17 is arranged in each of said bores. At the end remote from the head 11 each conveyor screw has a pin portion 17a with which it is rotatably supported in the rotor and which carries a gear 18. The gears 18 of all the screws 17 are in mesh with a common gear 19 (see also Fig. 2) mounted on the stationary bearing pin 13a so that the rotation of the rotor 10, 11 will cause each screw to rotate in addition thereto on its own axis. The rotor element 10 has arranged thereon in a tightly sealing relationship a stationary casing 20 subdivided into three annular chambers and provided on top with a correspondingly subdivided feed hopper 20a (see also Fig. 3). The bores 16 are connected each with a duct 10a provided in the rotor element 10 and inclined against the direction of rotation of the rotor, as shown in Fig. 3. At its periphery the rotor element 10 is provided with blade-type receiving members or scoops 21 which forwardly of their trailing edge project into the respective chambers of the casing 20 and at the same time over the inlet openings of the ducts 10a. Ducts 11a (see also Fig. 4) are formed in the extrusion head 11, which is also composed of different parts. These ducts 11a connect the bores 16 with orifices of a die 21 arranged in the extrusion head 11. A passage for the conductor 22 to be treated extends all through the machine along the axis of rotation of the rotor 10. The conductor 22 is introduced through a central bore in the bearing pedestal 13 and the bearing pin 13a, and leaves the machine through a central aperture in the die 21. The rotor element 10 and the extrusion head 11 have associated therewith electric heaters 23 and 24, respectively, which are fed through slip rings. The rotor 10, 11 is driven by a belt drive 25.

With the machine described above the electrical conductor, as will be explained in more detail hereinafter, may be provided with an insulating covering consisting of thermoplastic material and composed of three helically wound threads of different colors. To this end material in different colors is fed to the several chambers of the casing 20 through the compartments of the feed hopper 20a. Rotation of the rotor 10, 11 will cause the receiving blades 21 to plow through the material to convey it to the bores 16, wherein it is conveyed by means of the conveyor screws 17 under pressure through the ducts 11a to the die 21 and forced through the orifices thereof. At the same time the conductor 22 to be covered is passed through the machine. As this conductor performs its longitudinal motion, it is helically wound, at the exit end of the die rotating around it, with three threads of different colors forced out of the die and consisting of material which under the influence of the heaters is still in a plastic state. Immediately thereafter the material applied on the conductor in threads solidifies to form an integral insulating cover.

Figure 6:
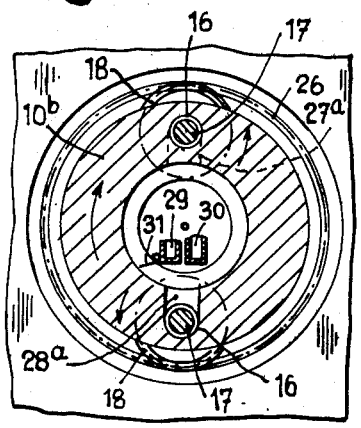
Fig. 6 is a cross-sectional view taken on line VI—VI in Fig. 5.
Figure 7:
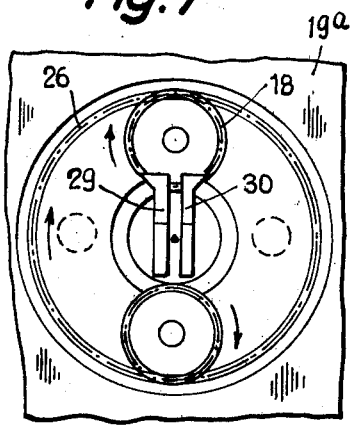
Fig. 7 is an end view of the machine viewed in the direction of the arrow VII of Fig. 5.

In the embodiment shown in Fig. 5 and constructed on the same principle as the machine described hereinbefore, the thermoplastic covering material is supplied to the bores 16 and conveyor screws 17 not from the outside by means of a feed unit (20, 20a) arranged on the rotor 10, 11, but is supplied from the inside, as will become apparent from the following explanation. To enable the material to be supplied in this manner, the drive of the conveyor screws 17 (only two of which are provided here) is effected by means of an internal gear ring 26, which is provided in the bearing pedestal 19a and in mesh with which the gears 18 of the screws 17 are moved by the rotation of the rotor element (10a). On the inside wall surface of the hollow rotor element 10b two grooves or passages 27, 28 are provided, which communicate through passage holes 27a, 28a, respectively, with the bores 16. Both passages 27, 28 have associated therewith two sloping material feed troughs 29, 30 (see also Figs. 6 and 7). At the downwardly directed discharge end of each of these troughs 29, 30 a scraper 31, which with its free end is resiliently urged against the bottom of the passages 27, 28, is arranged, in such a manner that rotation of the rotor in the direction of the arrow shown in Fig. 6 will cause the material fed to the passages 27, 28 to be forced through the holes 27a and 28a into the bores 16, from where, as has been explained hereinbefore, it is again fed by the action of the conveyor screws to the die rotating around the conductor. In contradistinction to the machine shown in Fig. 1, the wire 22 is covered here with an insulation consisting of only two threads of material in different colors.

In the aforedescribed embodiment of the extrusion machine the rotary speed of the conveyor screws is directly proportional to the rotary speed of the rotor and increases as the rotor is turned faster, because the drive gears provided at the rear end of the conveyor screws mesh with a common, stationary pinion arranged in the axis of rotation of the rotor. In practice it has been found that in certain cases it would be of advantage to provide for a variation of the rotary speed of the conveyor screws independent of the rotary speed of the rotor, to regulate the rate of supply of the thermoplastic material to the extrusion head.

Figure 8:
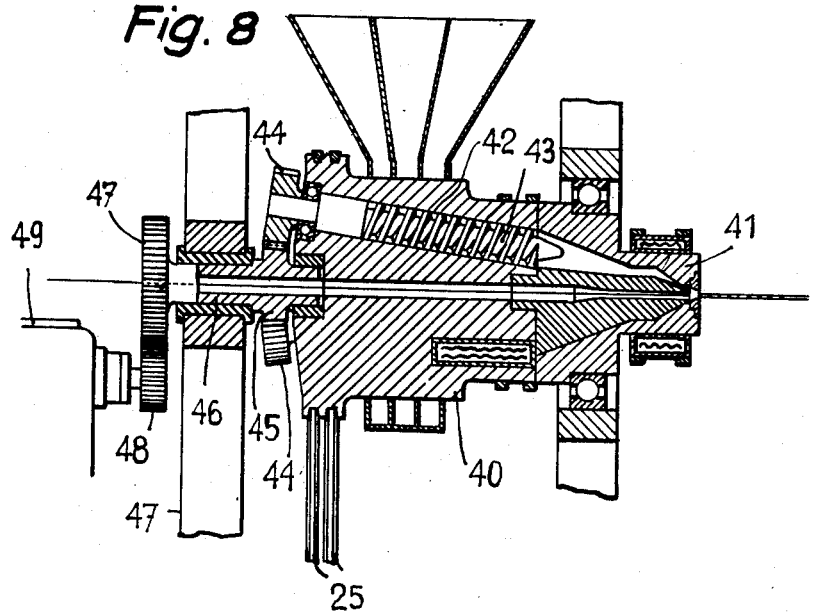
Fig. 8 is an axial, longitudinal sectional view of a third embodiment of the extrusion machine.

Fig. 8 shows an extrusion machine which provides for such regulation. Similarly as the two embodiments described already, this machine has a rotor element 40 driven by means of a belt drive 25 and assembled with an extrusion head 41. Again the rotor part 40 has bores 42 extending downwardly at an oblique angle from the rear to the front end of the rotor part 40. These bores again accommodate conveyor screws 43, which at their rear ends have a pin portion mounting a gear 44. The gears 44 are in mesh with a common toothed ring 45 which constitutes a pinion and is formed on a short, hollow shaft 46 which is supported by a pedestal 47, and on the front end of which the rotor part 40 is rotatably supported by means of a bearing ring. On the rear end of the hollow shaft 46 a gear 48 is provided, which is in mesh with the drive pinion 48 of a regulating drive 49. The other parts and the mode of operation of this machine correspond to the other embodiments so that further details thereof need not be treated. As will be clear from the foregoing explanation the essential difference resides in that the screw conveyors are driven independently of the rotor part 40 and that their rotary speed can be varied depending on circumstances (consistency of the material to be processed, speed of the conductor to be covered, etc.).

Obviously the embodiment shown in Fig. 5 could also comprise means providing for a variation of the rotary speed of the conveyor screws as explained with reference to the embodiment shown in Fig. 8. To this end the internal gear ring 26 would have to be supported rotatably, and be connected with separate drive means which enable this object to be achieved.

We claim:

1. An extrusion machine for the production of an insulating covering consisting of helically wound threads of thermoplastic material on an electrical conductor, which comprises an extrusion head having material feed ducts and a central passage for the conductor to be covered, feed means for the thermoplastic material, a rotor element secured to said extrusion head and having two end faces and longitudinal bores extending between said end faces and communicating with said feed means and feed ducts, conveyor screws in said longitudinal bores, gear drive means operatively connected with said conveyor screws to rotate same and thus cause them to convey into said ducts material supplied to said longitudinal bores from said material feed means, and means to rotate said rotor element and extrusion head.

2. An extrusion machine for the production of an insulating covering consisting of helically wound threads of thermoplastic material on an electrical conductor, which comprises an extrusion head carrying a die having die orifices, and having material feed ducts communicating with said die orifices and a central passage for the conductor to be covered, feed means for the thermoplastic material, a rotor element secured to said extrusion head and having two end faces and longitudinal bores extending between said end faces and communicating with said feed means and feed ducts, conveyor screws in said longitudinal bores, gear drive means operatively connected with said conveyor screws to rotate same and thus cause them to convey into said ducts material supplied to said longitudinal bores from said material feed means, and means to rotate said rotor element and extrusion head.

3. An extrusion machine for the production of an insulating covering consisting of helically wound threads of thermoplastic material on an electrical conductor, which comprises an extrusion head having material feed ducts and a central passage for the conductor to be covered, feed means for the thermoplastic material, a rotor element secured to said extrusion head and having two end faces and longitudinal bores extending between said end faces and communicating with said feed means and feed ducts, conveyor screws in said longitudinal bores, means to rotate said rotor element and extrusion head, said conveyor screws having a rear pin portion each supported in said rotor element, a gear on each of said rear pin portions, and a pinion mounted in the axis of rotation of said rotor element and in mesh with all said gears to cause said conveyor screws to rotate about its own axis each and convey into said ducts material supplied to said longitudinal bores from said material feed means.

4. An extrusion machine for the production of an insulating covering consisting of helically wound threads of thermoplastic material on an electrical conductor, which comprises an extrusion head having material feed ducts and a central passage for the conductor to be covered, a rotor element secured to said extrusion head and having two end faces and longitudinal bores extending between said end faces and communicating with said feed ducts, stationary feed means defining a plurality of separate feed passages for the thermoplastic material, said passages being equal in number with said longitudinal bores, connecting passages provided in said rotor element and connecting said feed passages with said longitudinal bores, conveyor screws in said longitudinal bores, gear drive means operatively connected with said conveyor screws to rotate same and thus cause them to convey into said feed ducts material supplied to said longitudinal bores from said feed means, and means to rotate said rotor element and extrusion head.

5. An extrusion machine for the production of an insulating covering consisting of helically wound threads of thermoplastic material on an electrical conductor, which comprises an extrusion head having material feed ducts and a central passage for the conductor to be covered, a rotor element secured to said extrusion head and having two end faces and longitudinal bores extending between said end faces and communicating with said feed ducts, stationary feed means comprising a stationary casing arranged at said rotor element and divided into chambers defining a plurality of separate feed passages for the thermoplastic material, said passages being equal in number with said longitudinal bores, ducts in said rotor element constituting connecting passages connecting said feed passages with said longitudinal bores, conveyor screws in said longitudinal bores, means to rotate said rotor element and extrusion head, said conveyor screws having a rear pin portion each supported in said rotor part, a gear on each of said rear pin portions, and a pinion mounted in the axis of rotation of said rotor part and in mesh with all said gears to cause said conveyor screws to rotate about its own axis each and convey into said feed ducts material supplied to said longitudinal bores from said material feed means.

6. An extrusion machine for the production of an insulating covering consisting of helically wound threads of thermoplastic material on an electrical conductor, which comprises an extrusion head having material feed ducts and a central passage for the conductor to be covered, a rotor element secured to said extrusion head and having two end faces and longitudinal bores extending between said end faces and communicating with said feed ducts, stationary feed means defining a plurality of separate feed passages for the thermoplastic material, said passages being equal in number with said longitudinal bores, material receiving means carried by the rotor element at its periphery and connecting passages provided in said rotor element, said receiving means and connecting passages connecting said feed passages with said longitudinal bores, said material receiving means being adapted to receive material from said feed passages and convey it to said longitudinal bores under the influence of a rotation of said rotor element, conveyor screws in said longitudinal bores, means to rotate said rotor element and extrusion head, said conveyor screws having a rear pin portion each supported in said rotor element, a gear on each of said rear pin portions, and a pinion mounted in the axis of rotation of said rotor element and in mesh with all said gears to cause said conveyor screws to rotate about its own axis each and convey into said ducts supplied to said longitudinal bores from said material feed means.

7. An extrusion machine for the production of an insulating covering consisting of helically wound threads of thermoplastic material on an electrical conductor, which comprises an extrusion head having material feed ducts and a central passage for the conductor to be covered, a rotor part connected to said extrusion head and having two end faces and longitudinal bores extending between said two end faces and communicating with said feed ducts, stationary feed means comprising a stationary casing arranged at said rotor part and divided into chambers defining a plurality of separate feed passages for the thermoplastic material, said passages being equal in number with said longitudinal bores, connecting ducts in said rotor part constituting connecting passages having openings in the periphery of said rotor part and leading to said longitudinal bores, a material receiving blade associated with each of said chambers and provided on the periphery of said rotor part, each of said blades having a trailing edge and forwardly of said trailing edge projecting into the chamber with which it is associated and over the opening of one of said connecting ducts in the periphery of said rotor part, conveyor screws in said longitudinal bores, means to rotate said rotor part, said conveyor screws having a rear pin portion each supported in said rotor part, a gear on each of said rear pin portions, and a pinion mounted in the axis of rotation of said rotor part and in mesh with all said gears to cause said conveyor screws to rotate about its own axis each and convey into said feed ducts material supplied to said longitudinal bores from said material feed means.

8. An extrusion machine for the production of an insulating covering consisting of helically wound threads of thermoplastic material on an electrical conductor, which comprises an extrusion head having material feed ducts and a central passage for the conductor to be covered, a rotor part connected to said extrusion head and having two end faces and longitudinal bores extending between said end faces and communicating with said feed ducts, stationary feed means comprising a stationary casing arranged at said rotor part and divided into chambers defining a plurality of separate feed passages for the thermoplastic material and a feed hopper mounted adjacent to the top of said casing and comprising a plurality of compartments each of which communicates with one of said chambers, said passages being equal in number with said longitudinal bores, ducts in said rotor part consituting connecting passages connecting said feed passages with said longitudinal bores, conveyor screws in said longitudinal bores, means to rotate said rotor part, said conveyor screws having a rear pin portion each supported in said rotor part, a gear on each of said rear pin portions, and a pinion mounted in the axis of rotation of said rotor part and in mesh with all said gears to cause said conveyor screws to rotate about its own axis each and to convey into said feed ducts material supplied to said longitudinal bores from said material feed means.

9. An extrusion machine for the production of an insulating covering consisting of helically wound threads of thermoplastic material on an electrical conductor, which comprises an extrusion head having material feed ducts and a central passage for the conductor to be covered, a rotor part connected to said extrusion head and having two end faces and longitudinal bores extending between said end faces and communicating with said feed ducts, stationary feed means defining a plurality of separate feed passages for the thermoplastic material, said passages being equal in number with said longitudinal bores, connecting passages provided in said rotor part and connecting said feed passages with said longitudinal bores, conveyor screws in said longitudinal bores, means to rotate said rotor part, said conveyor screws having a rear pin portion each supported in said rotor part, a gear on each of said rear pin portions, and a stationary pinion mounted in the axis of rotation of said rotor part and in mesh with all said gears to cause said conveyor screws to rotate about its own axis each by the rotation of said rotor part and convey into said ducts material supplied to said longitudinal bores from said material feed means.

10. An extrusion machine for the production of an insulating covering consisting of helically wound threads of thermoplastic material on an electrical conductor, which comprises an extrusion head having material feed ducts and a central passage for the conductor to be covered, a rotor part connected to said extrusion head and having two end faces and longitudinal bores extending between said end faces and communicating with said feed ducts, stationary feed means defining a plurality of separate feed passages for the thermoplastic material, said passages being equal in number with said longitudinal bores, connecting passages provided in said rotor part and connecting said feed passages with said longitudinal bores, conveyor screws in said longitudinal bores, means to rotate said rotor part, said conveyor screws having a rear pin portion each supported in said rotor part, a gear on each of said rear pin portions, a bearing pedestal, a bearing pin protruding from said bearing pedestal, and a stationary pinion mounted on said bearing pin in the axis of rotation of said rotor part and in mesh with all said gears to cause said conveyor screws to rotate about it own axis each by the rotation of said rotor part and convey into said ducts material supplied to said longitudinal bores from said material feed means, said rotor part having a bearing ring rotatably supported on said bearing pin.

11. An extrusion machine for the production of an insulating covering consisting of helically wound threads of thermoplastic material on an electrical conductor, which comprises an extrusion head having material feed ducts and a central passage for the conductor to be covered, a hollow rotor part connected to said extrusion head and having two end faces and longitudinal bores extending between said end faces and communicating with said feed ducts, stationary feed means defining a plurality of separate feed passages for the thermoplastic material, said passages being equal in number with said longitudinal bores, connecting passages provided in said rotor part and connecting said feed passages with said longitudinal bores, conveyor screws in said longitudinal bores, means to rotate said rotor part, said conveyor screws having a rear pin portion each supported in said rotor part, a gear on each of said rear pin portions, and a stationary internal gear ring constituting a stationary pinion and mounted in the axis of rotation of said rotor part and in mesh with all said gears to cause said conveyor screws to rotate about its own axis each by the rotation of said rotor part and convey into said ducts material supplied to said longitudinal bores from said material feed means.

12. An extrusion machine for the production of an insulating covering consisting of helically wound threads of thermoplastic material on an electrical conductor, which comprises an extrusion head having material feed ducts and a central passage for the conductor to be covered, a hollow rotor part connected to said extrusion head and having two end faces and longitudinal bores extending between said end faces and communicating with said feed ducts, stationary feed means comprising stationary, inclined feed troughs defining a plurality of separate feed passages for the thermoplastic material, said passages being equal in number with said longitudinal bores, connecting passages provided in said rotor part and connecting said feed passages with said longitudinal bores, said connecting passages comprising a groove associated with each of said feed troughs and provided on the inside surface of said rotor part, and an opening connecting said groove with one of said longitudinal bores, conveyor screws in said longitudinal bores, means to rotate said rotor part, said conveyor screws having a rear pin portion each supported in said rotor part, a gear on each of said rear pin portions, and an internal gear ring constituting a pinion mounted in the axis of rotation of said rotor part and in mesh with all said gears to cause said conveyor screws to rotate about its own axis each and convey into said ducts material supplied to said longitudinal bores from said material feed means, said feed troughs extending through said internal gear ring.

13. An extrusion machine for the production of an insulating covering consisting of helically wound threads of thermoplastic material on an electrical conductor, which comprises an extrusion head having material feed ducts and a central passage for the conductor to be covered, a hollow rotor part connected to said extrusion head and having two end faces and longitudinal bores extending between said end faces and communicating with said feed ducts, stationary feed means comprising stationary, inclined feed troughs defining a plurality of separate feed passages for the thermoplastic material, said passages being equal in number with said longitudinal bores, connecting passages provided in said rotor part and connecting said feed passages with said longitudinal bores, said connecting passages comprising a groove associated with each of said feed troughs and provided on the inside surface of said rotor part, and an opening connecting said groove with one of said longitudinal bores, said feed troughs having a discharge end each and carrying adjacent to said discharge end a scraper having a free edge contacting the bottom of one of said grooves, said scrapers being adapted to force material into said longitudinal bores through said openings under the influence of a rotation of said rotor part, conveyor screws in said longitudinal bores, means to rotate said rotor part, said conveyor screws having a rear pin portion each supported in said rotor part, a gear on each of said rear pin portions, and an internal gear ring constituting a pinion mounted in the axis of rotation of said rotor part and in mesh with all said gears to cause said conveyor screws to rotate about its own axis each and convey into said ducts material supplied to said longitudinal bores from said material feed means, said feed troughs extending through said internal gear ring.

14. An extrusion machine for the production of an insulating covering consisting of helically wound threads of thermoplastic material on an electrical conductor, which comprises an extrusion head having material feed ducts and a central passage for the conductor to be covered, a rotor part connected to said extrusion head and having two end faces and longitudinal bores extending between said end faces and communicating with said feed ducts, stationary feed means defining a plurality of separate feed passages for the thermoplastic material, said passages being equal in number with said longitudinal bores, connecting passages provided in said rotor part and connecting said feed passages with said longitudinal bores, conveyor screws in said longitudinal bores, means to rotate said rotor part, said conveyor screws having a rear pin portion each supported in said rotor part, a gear on each of said rear pin portions, a pinion, means rotatably to support said pinion in the axis of rotation of said rotor part, and variable-speed drive means operatively connected to said pinion to drive same, said pinion being in mesh with all said gears to cause said conveyor screws to rotate about its own axis each and convey into said ducts material supplied to said longitudinal bores from said material feed means.

15. An extrusion machine for the production of an insulating covering consisting of helically wound threads of thermoplastic material on an electrical conductor, which comprises an extrusion head having material feed ducts and a central passage for the conductor to be covered, a hollow rotor part connected to said extrusion head and having two end faces and longitudinal bores extending between said end faces and communicating with said feed ducts, stationary feed means defining a plurality of separate feed passages for the thermoplastic material, said passages being equal in number with said longitudinal bores, connecting passages provided in said rotor part and connecting said feed passages with said longitudinal bores, conveyor screws in said longitudinal bores, means to rotate said rotor part, said conveyor screws having a rear pin portion each supported in said rotor part, a gear on each of said rear pin portions, an internal gear ring constituting a pinion in mesh with all said gears to cause said conveyor screws to rotate about its own axis each and convey into said ducts material supplied to said longitudinal bores from said material feed means, means rotatably to support said pinion in the axis of rotation of said rotor part, and variable-speed drive means operatively connected to said pinion to drive same.

16. An extrusion machine for the production of an insulating covering consisting of helically wound threads of thermoplastic material on an electrical conductor, which comprises an extrusion head having material feed ducts and a central passage for the conductor to be covered, feed means for the thermoplastic material, a rotor part having two end faces and being connected to said extrusion head adjacent to one of said end faces and having longitudinal bores extending between said end faces and communicating with said feed means and feed ducts, said longitudinal bores being spaced from each other at the end of the rotor part adjacent to said extrusion head at most as widely as at the other end thereof, conveyor screws in said longitudinal bores, gear drive means operatively connected with said conveyor screws to rotate same and thus cause them to convey into said ducts material supplied to said longitudinal bores from said material feed means, and means to rotate said rotor part.

17. An extrusion machine for the production of an insulating covering consisting of helically wound threads of thermoplastic material on an electrical conductor, which comprises an extrusion head having material feed ducts and a central passage for the conductor to be covered, a rotor part connected to said extrusion head and having two end faces and longitudinal bores parallel each other extending between said end faces and communicating with said feed ducts, stationary feed means defining a plurality of separate feed passages for the thermoplastic material, said passages being equal in number with said longitudinal bores, connecting passages provided in said rotor part and connecting said feed passages with said longitudinal bores, conveyor screws in said longitudinal bores, means to rotate said rotor part, said conveyor screws having a rear pin portion each supported in said rotor part, a gear on each of said rear pin portions, and a pinion mounted in the axis of rotation of said rotor part and in mesh with all said gears to cause said conveyor screws to rotate about its own axis each and convey into said ducts material supplied to said longitudinal bores from said material feed means.

18. An extrusion machine for the production of an insulating covering consisting of helically wound threads of thermoplastic material on an electrical conductor, which comprises an extrusion head having material feed ducts and a central passage for the conductor to be covered, a rotor part having two end faces and being connected to said extrusion head adjacent to one of said end faces and having longitudinal bores extending between said end faces and converging toward the end of the rotor part adjacent to said extrusion head, stationary feed means defining a plurality of separate feed passages for the thermoplastic material, said passages being equal in number with said longitudinal bores, connecting passages provided in said rotor part and connecting said feed passages with said longitudinal bores, conveyor screws in said longitudinal bores, means to rotate said rotor part, said conveyor screws having a rear pin portion each supported in said rotor part, a gear on each of said rear pin portions, and a pinion mounted in the axis of rotation of said rotor part and in mesh with all said gears to cause said conveyor screws to rotate about its own axis each and convey into said ducts material supplied into said longitudinal bores from said material feed means.

References Cited in the file of this patent

UNITED STATES PATENTS

| Number | Name | Date |
|---|---|---|
| 536,804 | Harsha | Apr. 2, 1895 |
| 817,080 | Mahoney | Apr. 3, 1906 |
| 1,322,464 | Oden | Nov. 18, 1919 |
| 2,610,607 | Isenberg | Sept. 16, 1952 |